United States Patent [19]

Nakane

[11] 4,384,862

[45] May 24, 1983

[54] CENTRIFUGAL OPERATING DEVICE

[75] Inventor: Mototaka Nakane, Toyota, Japan

[73] Assignee: Aisin Seiki Kabushiki Kaisha, Kariya, Japan

[21] Appl. No.: 165,207

[22] Filed: Jul. 1, 1980

[30] Foreign Application Priority Data

Jul. 2, 1979 [JP] Japan .................................. 54-83822

[51] Int. Cl.³ ........................ F16H 11/04; F16D 23/10
[52] U.S. Cl. ..................................... 474/13; 192/105 B
[58] Field of Search ....................... 474/12, 13, 46, 15; 192/105 B

[56] References Cited

U.S. PATENT DOCUMENTS

| 834,499 | 10/1906 | Sturtevant et al. | 192/105 B |
| 2,196,475 | 4/1940 | Reed | 192/105 B |
| 2,721,639 | 10/1955 | Miller | 192/105 B |
| 2,902,129 | 9/1959 | Reed | 192/105 B |
| 3,006,449 | 10/1961 | Binder | 192/105 B |
| 3,599,504 | 8/1971 | Taylor | 474/15 X |
| 3,680,403 | 8/1972 | Schupan | 474/13 |
| 3,685,366 | 8/1972 | Schupan | 474/13 |
| 3,757,593 | 9/1973 | Svenson | 474/12 |
| 3,916,707 | 11/1975 | Wells | 474/46 |
| 4,010,654 | 3/1977 | Maucher et al. | 474/13 |
| 4,028,953 | 6/1977 | Lavallee | 474/13 |
| 4,100,818 | 7/1978 | Woollard | 474/13 |
| 4,102,214 | 7/1978 | Hoft | 474/13 |

FOREIGN PATENT DOCUMENTS

| 1256022 | 12/1967 | Fed. Rep. of Germany. | |
| 52-36257 | 3/1977 | Japan | 474/12 |
| 924018 | 4/1963 | United Kingdom | 192/105 B |
| 947408 | 1/1964 | United Kingdom | 192/105 B |
| 948022 | 1/1964 | United Kingdom | 192/105 B |

Primary Examiner—Lawrence J. Staab
Attorney, Agent, or Firm—Oblon, Fisher, Spivak, McClelland & Maier

[57] ABSTRACT

A device for automatically changing the speed ratio between a drive shaft and a driven shaft, including a pair of pulleys mounted on the drive and driven shafts and each having two opposing flanges of truncated cone shape, the pulleys being linked by a V-belt and one pulley being loaded with centrifugally displaceable weights for the speed-change operation.

One of the flanges of each pulley is provided with a cover plate having a flat surface portion perpendicular to the rotational axis in face-to-face relation with a truncated-conical surface of the flange. Centrifugally displaceable weights in the form of rollers are located in contact with and between the flat surface portion and the truncated-conical surface portion displaceably radially outward for the speed-change operation. Each roller is constituted by a pair of cylindrical members fixed in opposite end portions of a short shaft and a cylindrical rotary member rotatably mounted in the middle portion and having an outer diameter slightly greater than the cylindrical members. The roller is held in rolling contact with the truncated-conical surface portion of the flange at the opposite end portions and with the flat surface portion of the cover plate in the middle portion to preclude sliding resistance.

3 Claims, 9 Drawing Figures

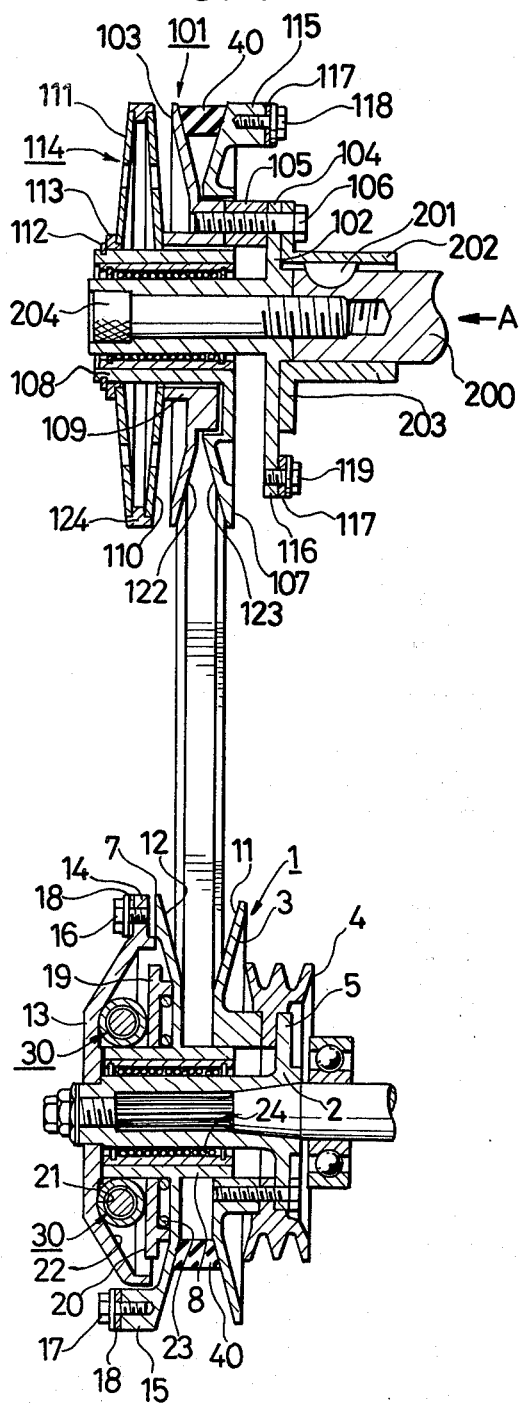
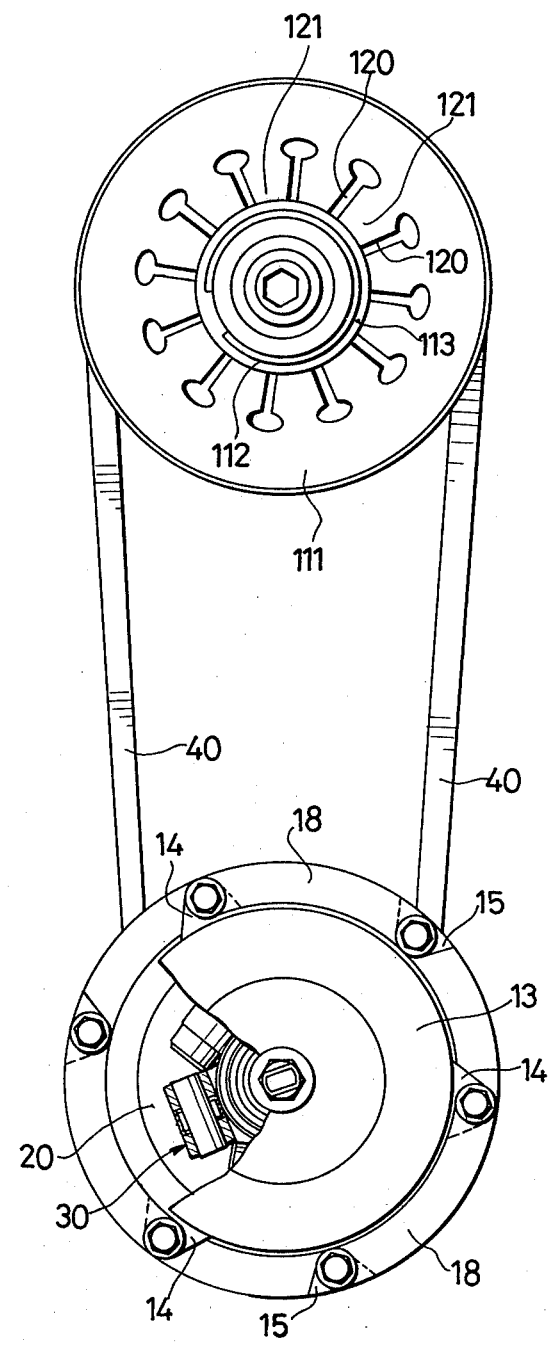

CENTRIFUGAL OPERATING DEVICE

BACKGROUND OF THE INVENTION

This invention relates to a device for controlling the transmission or speed of rotational power by centrifugal force, and more particularly to a centrifugal operating device applicable as a centrifugal clutch or a variable pulley of an automatic transmission.

As well known in the art, the centrifugal devices of this sort generally consist of a pair of flange members relatively slidable in the direction of rotational axis and a number of weights or centrifugally movable members which are located in a wedge-shaped space between the two flange members displaceably radially outward of the rotational axis to cause relative sliding movements to the two flange members. By the relative sliding movements, the two flange members are brought directly into or out of frictional engagement with each other or through a V-belt for transmission of rotation or for varying the effective pulley diameter for changing speed ratio.

SUMMARY OF THE INVENTION

It is an object of the present invention to provide an improved centrifugal operating device particularly useful in a variable pulley of an automatic transmission or in a centrifugal clutch which has a pair of normally spaced flange members relatively slidable toward and away from each other along an axis of rotation and a number of centrifugally displaceable members movable radially outward of the rotational axis to bring the two flanges into frictional engagement with each other directly or through an intervening element.

It is another object of the invention to provide a centrifugal operating device of the class mentioned above, employing centrifugal elements which are arranged to operate smoothly and efficiently without objectionable friction or vibrations.

It is still another object of the present invention to provide a centrifugal operating device of the class mentioned above, which is reliable in operation and simple in construction.

According to the present invention, there is provided a centrifugal operating device, comprising a pair of normally spaced flange members relatively slidable toward and away from each other in the direction of a rotational axis and a number of centrifugal elements displaceable radially outward of the rotational axis under the influence of centrifugal force to bring the two flange members into frictional contact with each other directly or through an intervening element. One of the flange members is provided with a coaxial cover plate on one side for rotation therewith. The flange member and cover plate have on the opposing sides a truncated-conical surface portion formed coaxially with the rotational axis and a flat surface portion formed perpendicular to the rotational axis. The centrifugal elements each consist of a pair of cylindrical members of the same outer diameter coaxially fixed in the opposite end portions of a short shaft and a cylindrical rotary member having an outer diameter slightly greater than the cylindrical members, and interposed in a space between the truncated-conical surface portion and the flat surface portion with the axis of the short shaft parallel with a line tangent to a circle coaxial with the rotational axis. The centrifugal elements have the cylindrical members in rolling contact with the truncated-conical surface portion and the rotary member with the flat surface portion when displaced radially outward to complete the frictional engagement of the two flange members.

The centrifugal operating device of the invention is particularly suitable for application to a variable pulley of an automatic transmission which employs a pair of flange members forming a substantially V-shaped space therebetween in a plane containing the rotational axis and providing friction surfaces on the opposing sides for receiving a V-belt. In a case where the centrifugal elements are used on a pulley which is connected to a drive shaft, a large reduction ratio is maintained immediately after starting the driven shaft when a large torque is required, varying the speed ratio as the speed of the drive shaft is increased and the required torque for the driven shaft becomes constant. On the other hand, where the centrifugal elements are used on a pulley which is connected to a driven shaft, the driven shaft is imparted with rotation corresponding to a required torque regardless of the rotational speed of the drive shaft. The centrifugal device of the invention can be advantageously applied to a pulley on either the drive or driven side of the automatic transmission as will be described in greater detail hereinafter.

The above and other objects, features and advantages of the present invention will become apparent from the following description and the appended claims, taken in conjunction with the accompanying drawings which show by way of example preferred embodiments of the present invention.

BRIEF DESCRIPTION OF THE DRAWINGS

In the accompanying drawings:

FIG. 1 is a diagrammatic sectional view of an automatic transmission incorporating the present invention for a variable pulley;

FIG. 2 is a partly cutaway side view of the transmission of FIG. 1;

DESCRIPTION OF PREFERRED EMBODIMENTS

Figure 3:
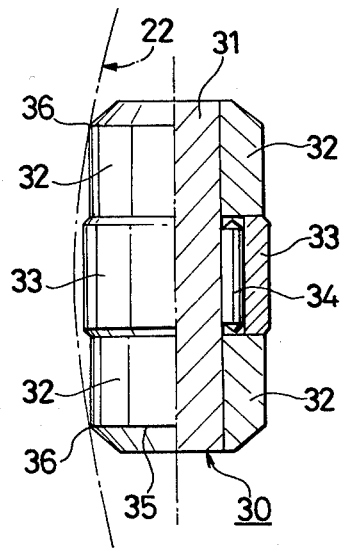
FIG. 3 is a half-sectioned side view of a centrifugal member.

Referring to the accompanying drawings and first to FIG. 1, there is shown an embodiment of the present invention, a variable pulley for the driven shaft of an automatic transmission. In FIG. 1, the variable pulley generally designated at 1 is assembled on a hub 2 which is fixedly mounted on a shaft 10, and includes a first flange member 3 which is, along with a drive pulley 4, fixed to a flange 5 formed at one end of the hub 2. A second flange member 7 is rotatably and axially slidably mounted on the hub 2 by way of a cylindrical portion 8 which is formed integrally in the center portion of the second flange member 7. The first flange member 3 is centrally provided with a center hole 9 of a relatively large diameter to receive the cylindrical portion 8 of the axially slidable second flange member 7, thus allowing convergence of the first and second flange members 3 and 7.

The first and second flange members 3 and 7 have a circular outer shape and are provided with frictional surfaces 11 and 12 of truncated cone shape in the radially outer half portions of the respective opposing faces, forming a V-shaped space in a plane containing the center axis of the pulley 1.

Fixed on the back side of the second flange member 7 is a cover plate 13 which has its center hole fitted on a stepped portion provided at the other end of the hub 2. The cover plate 13 is in the form of a tray and generally circular in outer shape, and integrally formed with radially outwardly extending triangular connecting tabs 14 at three spaced positions around the outer peripheral edge thereof. On the other hand, the second flange member 7 is provided on the outer periphery with connecting portions 15 of trapezoidal shape in section extending on the radially outside of the cover plate 13 toward the back side thereof. As seen in FIG. 2, arcuately punched leaf springs 18 are bridged between bolts 16 threaded into the connecting tabs 14 and bolts 17 threaded into the axial connecting portions 15 thereby connecting the second flange member 7 and the cover plate 13 together.

On one side of the second flange member 7 facing the cover plate 13, there is provided an auxiliary member 19 which has a flat surface portion 20 formed perpendicularly to the rotational axis and which is mounted directly on the second flange member 7 or splined on the cylindrical portion 8 coaxially with the flange member 7 as shown in FIG. 1. The cover plate 13 is provided with a flat center portion 21 and a peripheral portion 22 of truncated cone shape on the side facing the second flange member 7. A spring 23 is interposed between the auxiliary member 19 and the flange member 7, urging the auxiliary member 19 toward the cover plate 13. A bearing member 24 is interposed between the cylindrical portion 8 of the second flange member 7 and the hub 2 to ensure rotational and axial sliding movements of the flange member 7 on the hub 2.

As seen in the partly sectioned side view of FIG. 3, centrifugal operating members 30 are each constituted by a short shaft 31 which is axially divided into three sections, cylindrical members 32 secured in the opposite end sections by shrinkage fit or other suitable means, and a cylindrical rotary member 33 rotatably mounted in the intermediate section through roller pins 34 and having an outer diameter slightly greater than that of the cylindrical members 32 of the outer sections.

The centrifugal operating members 30 have the axes of the respective short shafts 31 disposed parallel with a tangent line to the circumference of the variable pulley 1, between the second flange member 7 and the cover plate 13. Therefore, as the variable pulley 1 is rotated, the centrifugal operating members are displaced radially outward under the influence of the centrifugal force between the flat surface portion 20 and the outer peripheral portion 22, thereby separating the cover plate 13 and the second flange member 7 from each other while letting the first and second flange members 3 and 7 come together. The difference in outer diameter between the cylindrical members 32 and the rotary member 33 of the centrifugal operating member 30 is determined as follows.

Figure 4:
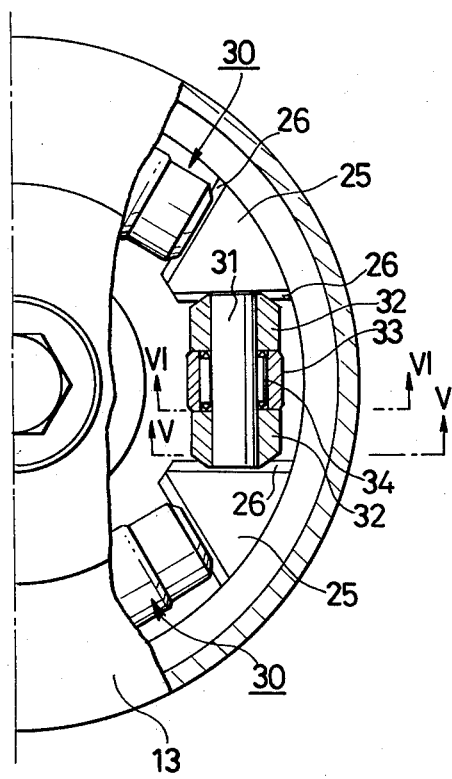
FIG. 4 is a partly cutaway fragmentary view of a flange member with a number of centrifugal members.

As shown in FIG. 4, the axes of the short shafts 31 are disposed parallel with a line tangent to the circumference of the pulley 1, namely, of the auxiliary member 19. The cylindrical members 32 are provided with a truncated cone surface 36 at the respective outer ends, bounded by an edge 35 (FIG. 3). As clear from the sectional view of FIG. 5 taken on line V—V along the edge 35, the outer truncated-conical portion 22 of the cover plate 13 and the centrifugal operating members 30 are brought into contact with each other by the edges 35 of the cylindrical members 32 at point 36. This is shown more clearly in the section on line III—III containing the axis of the short shaft 31 and point 36, in which the outer truncated-conical portion 22 of the cover plate 13 appears as indicated in broken line and the rotary member 33 has an outer diameter greater than the cylindrical members 32 but not great enough to contact the truncated-conical portion 22.

Figure 5:
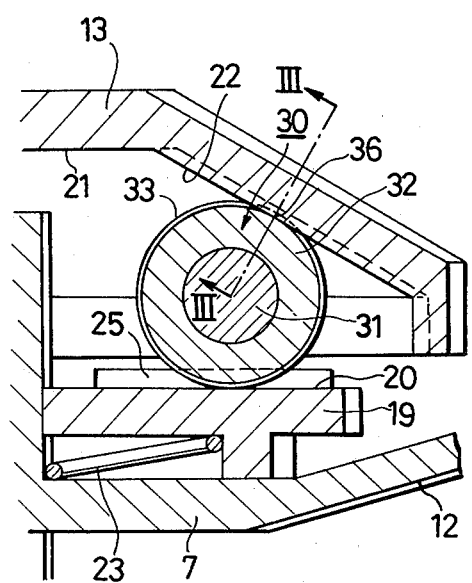
FIG. 5 is a sectional view taken on line V—V of FIG. 4.
Figure 6:
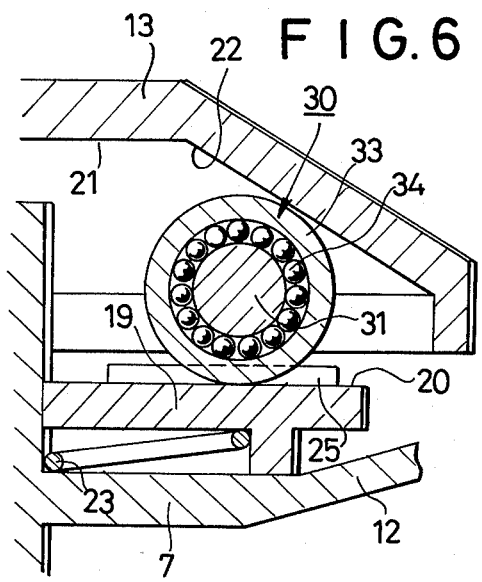
FIG. 6 is a sectional view taken on line VI—VI of FIG. 4.

Since the rotary member 33 of the centrifugal member 30 is formed to have an outside diameter slightly greater than the cylindrical members 32 as mentioned above, the cylindrical members 32 are contacted with the truncated-conical surface portion 22 of the cover plate 13 but not with the flat surface portion 20 of the auxiliary member 19 as shown in FIG. 5. On the other hand, as shown in FIG. 6, the rotary member 33 of the centrifugal operating member 30 is contacted with the flat surface portion 20 of the auxiliary member 19 but not with the outer truncated-conical surface portion 22 of the cover plate 13.

The centrifugal operating members 30 of the above-described construction give a number of advantages in the operation of the variable pulley 1. More particularly, when the variable pulley 1 is rotated to displace the centrifugal operating members 30 radially outward, the centrifugal members 30 roll to the right in FIGS. 5 and 6. Therefore, the cylindrical members 32 which roll to the right in contact with the truncated-conical surface portion 22 are rotated counterclockwise, tending to rotate the short shaft 31 counterclockwise. On the other hand, the rotary member 33 which rolls to the right in contact with the flat surface portion 20 is rotated clockwise. Although the rotary member 33 and the short shaft 31 are rotated in opposite directions, the centrifugal operating member 30 is rolled on and in rolling contact with both of the truncated-conical surface portion 22 and the flat surface portion 20 since the rotary member 33 is mounted on the short shaft 31 through the roller pins 34 rotatably relative to the short shaft 31 and to the cylindrical members 32. When the flange member 7 and the cover plate 13 are urged toward each other by the force of the spring 23 or other biasing means or under the influence of the centrifugal force acting on the centrifugal operating member 30, the edges 35 at the opposite ends of the short shaft 31 tend to maintain the contact with the truncated-conical surface portion 22. Therefore, the short shaft 31 always tends to maintain its axis parallel with a line tangential to the circumference of the pulley 1. In this connection, in the conventional variable pulley of an automatic transmission using balls as centrifugal operating elements, it has been necessary to provide guides for the ball displacements. In the present invention, there is no necessity for providing a guide for the centrifugal operating members 30. However, the centrifugal operating members 30 which are located in positions along the circumference of the pulley should be appropriately spaced from each other in order to preclude generation of vibrations. It is recommended to provide spacers 25 in equidistantly spaced positions on the flange member 7 or on the flat surface portion 20 of the auxiliary member 19.

The above-described variable pulley is linked by a V-belt 40 to another pulley 101, which is assembled on a hub 102 fixed on a shaft 200. The pulley 101 includes a flange member 103 which is joined with a flange 203 of a sleeve 202 rotationally interlocked with the shaft 200 by a key 201, and a flange 104 of the hub 102, by a bolt 106 which is threaded into a joint portion 105 of the flange member 103 through the flanges 203 and 104, for rotation with the shaft 200. A second flange member 107 has integrally in the central portion thereof a cylindrical portion 108 which is rotatably and axially slidably mounted on the hub 102. The first flange member 103 is centrally provided with a sleeve portion 109 which has an inner diameter greater than the outer diameter of the cylindrical portion 108. A pair of plate springs 110 and 111 of truncated cone shape are fitted on the cylindrical portion 108 of the flange member 107 on opposite sides of an annular member 124 and engaged with the latter at the respective outer peripheries. The plate spring 110 is abutted against the axial end face of the sleeve portion 109 of the flange member 107 on the inner side of its leg portion and at a point close to its center hole. The other disc spring 111 is abutted, on the outer side of its leg portion adjoining its center hole, against a stop ring 113 which is fixed at the outer end of the cylindrical portion 108 by a snap ring 112, thereby constituting a spring assembly 114.

The flange member 107 which is mounted on the hub 102 is provided with axial connecting portions 115 in three different positions around the outer peripheral edge thereof. On other hand, the hub 102 is provided with radial connecting portions 116 in three different positions around the outer peripheral edge of the flange 104. Arcuate leaf springs 117 are bridged between the axial and radial connecting portions 115 and 116 and have the respective opposite ends secured by bolts 118 and 119 which are threaded into the axial and radial connecting portions 115 and 116, respectively, thereby linking the flange member 107 and the hub 102 to each other. This linkage is of the same arrangement as the one provided by the leaf springs 18 between the axial extensions 14 and 15 of the cover plate and flange member 7 of the pulley 1.

As clear from FIG. 2, the disc springs 110 and 111 are provided with a number of radial notches 120 which open into the respective center holes, forming therebetween a number of radial leg portions 121 having the respective inner free ends contiguously to the center holes. This sort of plate springs allow to obtain desired spring characteristics simply by changing the shape of the leg portions 121.

The first and second flanges 103 and 107 of the pulley 101 are circular in outer shape and provided with friction surfaces 122 and 123 of truncated cone shape substantially on radially outer half portions of the opposing surfaces, forming a substantially V-shaped space in a plane containing the rotational axis of the pulley 101. In a free state, the V-shaped space is narrowest since the two flange members 103 and 107 are pressed to each other by the resilient force of the spring assembly.

Referring again to FIG. 1, the pulley 101 of the above-described construction is securely mounted on the drive shaft 200 by a key 201 and a bolt 204, while the pulley 1 is rotatably mounted on a fixed shaft 10. The two pulleys 1 and 101 are linked by a V-belt 40 which is lapped through the V-shaped space between the first and second flange members 103 and 107 of the pulley 101 and the V-shaped space between the first and second flange members 3 and 7 of the pulley 1, thereby constituting an automatic transmission for rotatingly driving an operating unit (not shown) by a pulley 4 which is fixedly mounted on the pulley 1.

In this embodiment, when the drive shaft 200 starts to rotate or the rotating drive force of a motor is transmitted to the drive shaft 200 through a clutch (not shown), the first and second flange members 103 and 107 of the pulley 101 are rotated through the hub 102 and the pulley 1 is rotated through V-belt 40. At that time, the V-belt 40 which is gripped between the friction surfaces 122 and 123 of truncated cone shaped by the resilient force of the spring assembly 114 is positioned on a larger diameter portion under the influence of the resilient force of the spring assembly 114, and the V-belt 40 which is gripped between the friction surfaces 11 and 12 of truncated cone shape is positioned on a smaller diameter portion against the force of the spring 23, driving the pulley 1 at a large speed ratio (a ratio of the rotational speed of driven side to that of drive side). As the rotational speed of the pulley 1 is increased, the centrifugal operating members 30 are displaced radially outward by the centrifugal force into the space between the outer truncated-conical surface portion 22 of the cover plate 13 and the flat surface portion 20 of the auxiliary member 19, causing the second flange member 12 to slide axially toward the first flange member 3, narrowing the V-shaped space to increase the effective radius of the pulley. At the same time, the V-belt 40 frictionally contacting the pulley 1 is subjected to an increased centrifugal force which tends to displace the V-belt 40 radially outward between the friction surfaces 11 and 12 of the first and second flange members 3 and 7. As a result, the V-belt 40 frictionally contacting the pulley 101 acts to slide the second flange member 107 in the axial direction against the force of the spring assembly 114, widening the V-shaped space between the first and second flange members 103 and 107 to reduce the effective radius of the pulley 101, thereby lowering the speed ratio automatically.

In the above-described speed-change operation, the centrifugal operating members 30 are displaced in radial directions while maintaining contact with the outer truncated-conical surface portion 22 of the cover plate 13 and the flat surface portion 20 of the auxiliary member 19. In this instance, the centrifugal operating members 30 are rolled smoothly with almost no friction since, as mentioned hereinbefore, the cylindrical members 32 and the rotary member 33 are rotatable relative to each other and are held separately in rolling contact with the outer truncated-conical surface portion 22 and the flat surface portion 20, respectively, although they are rotated in opposite directions. Moreover, as the centrifugal operating members 30 are contacted with the truncated-conical surface portion 22 at opposite ends thereof, they have self-adjusting action to maintain the respective axis parallel with a tangent to a circle concentric with the rotational axis. Therefore, as long as the centrifugal operating members 30 are gripped between the outer truncated-conical surface portion 22 and the flat surface portion 20, the above-described speed-changing operation is achieved without providing a guide for restricting the direction of displacement of the respective centrifugal operating members 30.

Figure 7:
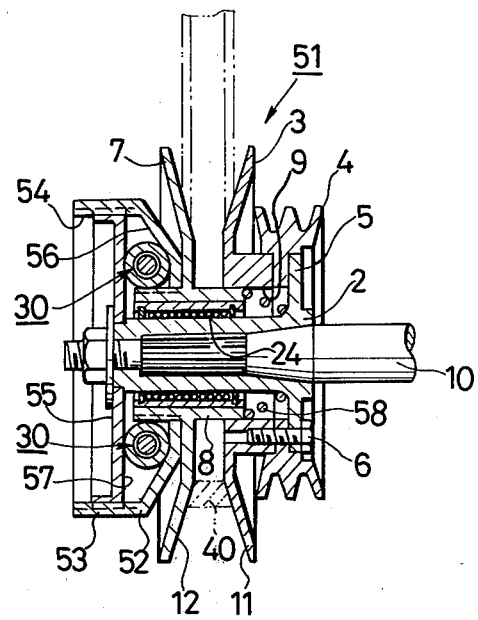
FIG. 7 is a diagrammatic sectional view of a pulley with a modified centrifugal device.

Referring to FIG. 7, there is shown a modification in which the truncated-conical surface portion is provided on the flange member 12 and the flat surface portion is provided on the cover plate of the variable pulley.

In the modification of FIG. 7, the pulley 51 has an auxiliary member 52 which is coaxially splined on the cylindrical portion 8 of the second flange member 7. The auxiliary member 52 has an outer end 53 of cylindrical shape with which a cover plate 55 bolted to the shaft 10 is axially slidably coupled through a spline 54 on the inner periphery of the outer cylindrical portion 54. A truncated-conical surface portion 56 and a flat surface portion 57 are provided on the opposing surfaces of the auxiliary member 52 and cover plate 55, respectively, gripping therebetween a number of centrifugal operating members 30 with aid of the resilient force of a spring 58.

In this modification, when the rotational speed of the pulley 51 is increased and the centrifugal operating members 30 are forced into the wedge-shaped space between the auxiliary member 52 and the cover plate 55 under the influence of the centrifugal force, the second flange member 7 is moved toward the first flange member 3 through the auxiliary member 52 to enlarge the effective diameter of the pulley carrying the V-belt 40. In this instance, the centrifugal operating members 30 are held in rolling contact with both the truncated-conical surface portion 56 and the flat surface portion 57, giving the same effects as in the foregoing embodiment.

Figure 8:
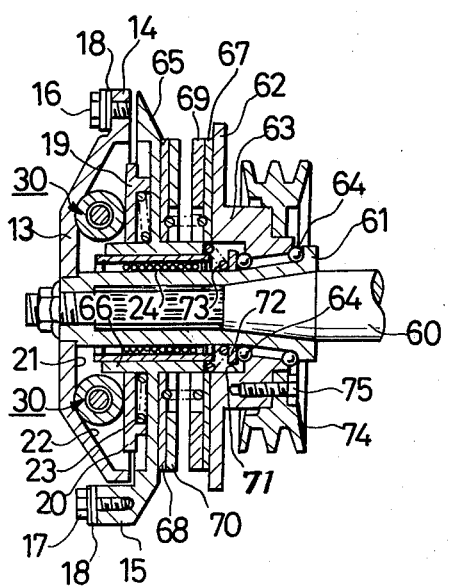
FIG. 8 is a diagrammatic sectional view of a centrifugal clutch incorporating the present invention.

Referring now to FIG. 8, there is shown a centrifugal operating device of the invention as applied to a centrifugal clutch. In this embodiment, a first flange member 62 has its cylindrical body portion 63 rotatably mounted through bearings 64 on a hub 61 which is fixed on a drive shaft 60. The other flange member 65 is rotatably and axially slidably mounted on the hub 61 by way of a cylindrical portion 66 which is formed integrally in the center portion of the flange member 65. The main body of the two flanges 62 and 65 are in the form of a disc and are provided with friction plates 69 and 70 on support plates 67 and 68 on the opposing surfaces, respectively. The center hole 71 of the flange member 62 is formed in a size suitable for receiving the cylindrical portion 66 of the second flange member 65. A spring 73 is mounted within the center hole 71 between the cylindrical portion 66 and a fixed portion 72, urging the second flange member 65 away from the first flange member 62 to disengage the friction plates 69, 70 from each other. Indicated at 74 is a drive pulley which is mounted on the cylindrical body portion 63 by a bolt 75 for driving an operating unit (not shown).

A cover plate 13 which is fixedly mounted on the hub 61 is provided on the back or outer side of the second flange member 65. An auxiliary member 19 is splined on the cylindrical portion 66 on the outer side of the second flange member 65, along with a spring 23. A number of centrifugal operating members 30 are interposed between a truncated-conical surface portion 22 of the cover plate 13 and a flat surface portion 20 of the auxiliary member 19. Axial projections on the outer peripheral edges of the cover plate 13 and the flange member 65 and bridged by arcuate leaf springs 18 attached by bolts 16 and 17 which are threaded into the axial projections. These arrangements and the resulting effects are the same as in the embodiment of FIG. 1, and thus like component parts are designated by like reference numerals.

With the centrifugal clutch of the above-described construction, when the drive shaft 60 is in rotation at a low speed, the centrifugal operating members 30 are not displaced radially outward. However, as the rotational speed of the drive shaft 60 is increased, the centrifugal operating members 30 are forced into the space between the truncated-conical surface portion 22 of the cover plate 13 and the flat surface portion 20 of the auxiliary plate 19 by the centrifugal force, pushing the second flange member 65 to the right against the action of the spring 73 to engage the friction plate 70 on the flange member 65 with the friction plate 69 on the first flange member 62, rotating the first flange member 62 on the hub 61 through the frictional contact with the friction plate 70 of the second flange member 65. As the rotational speed of the drive shaft 60 is further increased, the friction plates 69 and 70 are pressed by a strong force to rotate the first and second flange members 62 and 65 together. Thus, the driving force of the drive shaft 60 is transmitted to an operating unit through a belt which is spanned between the pulley 74 and the operating unit. When the rotational speed of the drive shaft 60 is dropped below a predetermined value, the force of the spring 73 overcomes the centrifugal force acting on the second flange member 65 through the centrifugal operating members, and the friction plates 69 and 70 are disengaged from each other to cut the transmission of rotational force to the pulley 4.

Figure 9:
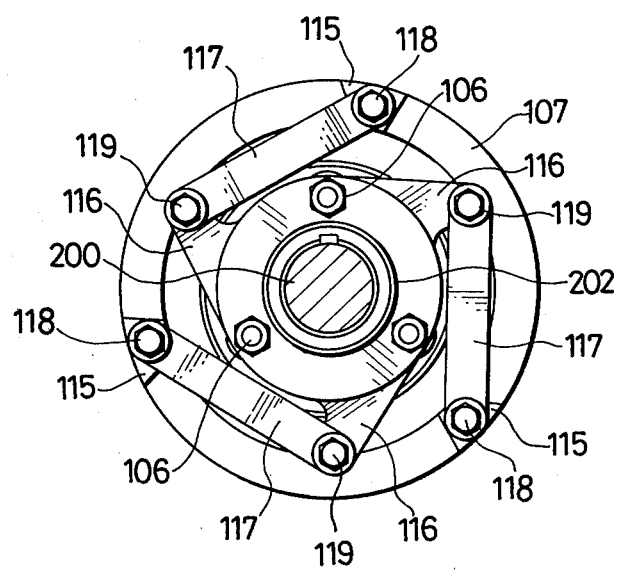
FIG. 9 is a side view of an upper pulley of FIG. 1 as seen in the direction of arrow A.

This embodiment is exactly the same as the arrangement of FIG. 1 in that the rotation of the hub 61 is transmitted through the cover plate 13, arcuate leaf spring 18, second flange member 65 and auxiliary member 19 to rotate the centrifugal operating members 30 about the rotational axis. The operation and effects attained by this arrangement is the same as in the embodiment of FIG. 1 and thus omitted to avoid repetition. In the centrifugal clutch of this embodiment, each centrifugal operating member 30 likewise consists of a pair of cylindrical members 32 coaxially fixed on opposite end portions of a short shaft 31 and a rotary member 33 located coaxially in the middle portion of the short shaft 31 rotatably relative to the short shaft 31 and the cylindrical members 32 and having an outer diameter slightly larger than the cylindrical members 32. Therefore, when coupling and uncoupling the centrifugal clutch, the cylindrical members 32 and the rotary member 33 are respectively held in rolling contact with the truncated-conical surface portion 22 and the flat surfaces portion 20 without sliding resistance, so that no vibrations or striking sounds are produced when operating the clutch. FIG. 9 shows in side view the pulley 101 as seen in the direction of arrow A of FIG. 1.

It will be understood from the foregoing description that, when the centrifugal operating members are displaced radially outward by the centrifugal force resulting from rotation of the centrifugal operating device, they are moved perpendicularly to the axis of the respective short shafts holding the cylindrical and rotary members in rolling contact with the truncated-conical surface portion and the flat surface portion, respectively. The truncated-conical surface portion which has an arcuate sectional shape in a plane containing the axes of the short shafts is contacted by the cylindrical members at the opposite ends of the short shafts. On the other hand, the flat surface portion is contacted by the rotary members of the respective centrifugal operating members which have a larger outer diameter than the cylindrical members. It follows that the cylindrical and rotary members never be simultaneously contacted with either the truncated-conical surface portion or the flat surface portion. Although the cylindrical and rotary members are rolled in opposite direction by contact with the truncated-conical and flat surface portions, this causes no problem since the rotary member is rotatable relative to the cylindrical member and short shaft. Owing to the rolling contact, the radial displacement of the centrifugal operating members causes only an extremely small frictional resistance and free from vibrations of rattling as encountered with conventional sliding type centrifugal elements.

Moreover, the centrifugal operating members have a self-adjusting action during displacement to correct any deviation of the axis of the short shaft from a direction parallel with a tangent to a circle concentric with the truncated-conical surface portion, thereby preventing unbalanced frictional engagement of the flanges.

Furthermore, the centrifugal operating device of the invention can be produced at a low cost since it employs only those component parts which are easily obtainable or which can be prepared by simple machining operations.

What is claimed is:

1. A centrifugal operating device, comprising:

a pair of normally spaced flange members relatively slidable toward and away from each other in the direction of a rotational axis; and a number of centrifugal elements displaceable radially outward of the rotational axis under the influence of centrifugal force to bring said flange members into frictional contact with each other directly or through an intervening element;

one of said flange members being provided with a coaxial cover plate on one side for rotation therewith, said flange member and cover plate having on the opposing sides a truncated-conical surface portion formed coaxially with the rotational axis and a flat surface portion formed perpendicular to the rotational axis;

said centrifugal elements each consisting of a pair of cylindrical members of the same outer diameter coaxially fixed in the opposite end portions of a short shaft and a cylindrical rotary member having an outer diameter slightly greater than said cylindrical members, and located in a space between said truncated-conical surface portion and said flat surface portion with the axis of said short shaft parallel with a line tangent to a circle coaxial with said rotational axis;

said centrifugal elements having said cylindrical members being in rolling contact with said truncated-conical surface portion only at opposing edges of opposite end portions thereof and said cylindrical rotary member with said flat surface portion at the outer peripheral surface thereof, while keeping a small distance between said truncated-conical surface portion and said outer peripheral surface thereof, whereby said centrifugal elements are self guided to move only in a radial direction without additional guide means.

2. A centrifugal operating device as defined in claim 1, wherein said flange members form therebetween a space of substantially V-shape in a plane containing said rotational axis and are provided with friction surfaces on the opposing faces for engagement with a V-belt, constituting a variable pulley for an automatic transmission.

3. A centrifugal operating device as defined in claim 1, wherein said flange members are relatively rotatable and are provided with friction elements on the opposing faces thereof, constituting a centrifugal clutch.

* * * * *